United States Patent Office 3,215,521
Patented Nov. 2, 1965

3,215,521
METHOD FOR THE DIRECT REDUCTION OF IRON ORE PELLETS
Kurt Meyer, Frankfurt am Main, Hans Rausch, Oberursel, Günther Heitmann, Frankfurt am Main, and Wolfgang Janke, Oberursel, Germany, assignors to Metallgesellschaft Aktiengesellschaft, Frankfurt am Main, Germany
No Drawing. Filed Jan. 29, 1963, Ser. No. 254,561
Claims priority, application Germany, Feb. 2, 1962, M 51,665
3 Claims. (Cl. 75—5)

This invention relates to the direct reduction of heat-hardened iron ore pellets in a rotating cylindrical furnace.

This invention is an improvement in the process as set forth in our copending application Serial No. 242,622, filed December 6, 1962, for "Process for the Direct Reduction of Iron Ores in Rotating Cylindrical Furnaces." In the aforesaid application, a process is disclosed for the direct reduction of heat-hardened iron ore pellets in a cylindrical furnace by means of the carbon monoxide formed within the furnace from or by the admixture of solid material containing the reducing carbon monoxide. The hot pellets heat hardened on the sinter band are cooled only to the extent necessary for the sifting of the pellets from the inert grate protective liner and, if necessary, from the side wall protection lining. That is, the pellets are cooled to a temperature of about 600° C. and then fed to the furnace at about that temperature. A more efficient use of the sinter band surface and the cylindrical furnace, including an improved heat economy is thereby obtained.

The object of this invention is to improve upon the aforesaid process in that heat-hardened pellets of less quality can be used as compared with the aforesaid process in which pellets are heat hardened at a temperature of about 1200° to 1400° C. According to this invention, it has been found that the firmness or crushing strength of the hot pellets while still hot is not materially different from that of the same pellets after they have been cooled, even though the cooling is done very carefully. Accordingly, it is possible to use pellets while still hot and of lesser cold crushing strength in direct proportion to the increase in the temperature of the cylindrical furnace into which the pellets are fed. It has also been found that pellets used in a cylindrical furnace do not need to have as high a crushing strength as that of pellets charged into a blast furnace. Thus, according to this invention, the pellets are heat hardened at a lower temperature than used heretofore and before the pellets are fed into the cylindrical furnace. According to this invention, it is only necessary that the pellets have an average crushing strength of less than 100 kilograms per pellet and, in many cases, from 10 to 50 kilograms per pellet while cold.

Further, according to this invention, it is often possible to lessen the maximum temperature needed for the heat hardening of the pellets to such an extent that the otherwise indispensable protective grate lining and side wall lining is unnecessary, which means that the sifting of the hot pellets as described in our aforesaid application Serial No. 242,622 is omitted. Therefore, it is no longer necessary to subject the hot pellets to an intermediate cooling before they are charged into the cylindrical furnace. In this invention, the hot pellets are charged into the rotary furnace immediately after being discharged from the sinter band and at a temperature of from about 900 to 1150° C., preferably from 1000 to 1100° C.

A further advantage of this invention lies in that the time for the reduction of the pellets charged into the cylindrical furnace at very high temperatures is much less than that required when the pellets are charged at a low temperature, which means that the reduction is accomplished quicker than heretofore possible while avoiding the dangerous intermediate step of reducing the FeO which, mechanically speaking, is far more sensitive than the raw starting product and the final discharged product, especially as far as abrasion is concerned.

Further, according to this invention, the waste gases of the cylindrical furnace are used for the roasting and heat hardening on the sinter band, whereas heretofore such gases were used for preheating the green pellets on the sinter band, while the final roasting of the pellets without reduction took place in the first portion of the cylindrical furnace. In this invention, as far as required, the final or discharge zone of the sinter band is maintained at a constant temperature of one or more additional burners. Since it is not only possible to use both the radiant heat and primarily the latent heat in the waste gases and present in the form of CO for the heat hardening of the pellets, it is expedient to control the additional burner and/or burners as a function of and dependent upon the quantity, temperature, and/or CO content of the waste gases taken from the cylindrical furnace. The excess, if any, of the radiant and latent heat content of the waste gases from the cylindrical furnace can be used in a well known manner for the preheating of the combustion air.

*Example 1*

(Prior art)

The iron ore used for making the pellets was a magnetite of which 70% had a particle size below 60 microns. The pellets were formed on a pelletizing plate having a diameter of 1 meter and by adding 10% water with regard to the material being pelletized. The green pellets so formed had a diameter of from 10 to 15 mm. and were heat hardened on a sinter band having a suction surface of 1.5 m.$^2$, and at a temperature of 1280° C. The protective grate layer for the sinter band was composed of a 10 cm. thick layer of pre-burnt broken pellets, and the side wall protecting layers were composed of pre-burnt broken pellets having a particle size of 4 to 8 mm. formed into a 6 cm. thick layer. The daily output of the sinter band, including cooling the pellets to 100° C., amounted to 20 tons of pellets per each square meter of sinter band surface. The energy consumed for pelletizing and heat hardening of the pellets was 400 calories per each kilogram of pellets.

These heat hardened pellets having diameters of from 10 to 15 mm. were fed at the rate of 30 tons per day into a cylindrical rotary furnace 20 m. long and having a diameter of 1.5 m. The furnace was provided with six wall burners and one central burner.

The chemical composition of the raw pellets was 67% iron, 0.01% sulphur, and about 4% gangue.

13.5 tons of anthracite coal having a 5% water content was fed per day into the rotary furnace for providing the reducing material. This coal had the following composition:

| | Percent |
|---|---|
| $C_{fix}$ | [1]80 |
| Ashes | [1]12.2 |
| Volatile components | 17 |

[1] In regard to the dry weight.

For neutralizing the sulphur, 1.35 metric tons of dolomite having a grain size of 1 to 3 mm. were fed per day into the rotary furnace.

The first 8 meters of the rotary furnace served as the pellet preheating zone and raised the temperature of the charged pellets from 20 to 1100° C., while the last 12 meters of the furnace length operated solely as the reduction zone at a temperature of about 1100° C. 4630 Nm.$^3$ of town gas per day were fed into the furnace by way of the central and wall burners with the lowest value of heat being 3900 kcal. per Nm.³. The quantity of waste gas amounted to 75,000 Nm.³ per day, and the temperature of the waste gas at the discharge end of the furnace was approximately 600° C. The unburned component content of the waste gas was less than 1%.

The output of the furnace was 21.5 tons of reduced pellets, 5.5 tons of excess carbon material in the form of coal, as well as the burned dolomite, and an amount of coal ashes. About 25% of the pellets produced had a particle size less than 10 mm. and had the following chemical composition:

|  | Percent |
|---|---|
| Total iron | 93.3 |
| Metallic iron | 89.8 |
| Sulphur | 0.01 |
| Carbon | 0.07 |

*Example 2*

(According to our copending application Serial No. 242,622, filed Dec. 6, 1962)

The raw green pellets were made in the same way as described in Example 1. These pellets were heat hardened on the same sinter band as in Example 1 which had the same grate and wall protective layers.

The pellets were heat hardened at a temperature of about 1280° C. and then cooled to only 600° C. on the sinter band as contrasted to Example 1. Thus the capacity of the sinter band was increased about 20% by giving a daily output of 36 tons of pellets per day which corresponded to a capacity of 24 tons of pellets per square meter of sinter band surface. The hot pellets removed separate the sinter band were sifted on a hot sieve from the broken pellets serving as the grate and wall protective layers, and the hot pellets having a grain size of from 10 to 15 mm. and a temperature of about 600° C. were fed into the rotary furnace of Example 1 at a rate of 36 tons of pellets per day.

The reducing material was composed of 16.2 metric tons of anthracite coal having a 5% water content fed per day into the furnace. This anthracite had the same chemical composition as in Example 1.

For neutralizing the sulphur, 1.6 metric tons of dolomite having a grain size of 1 to 3 mm. were fed per day into the furnace.

The first 4 meters of the rotary furnace length served as the pellet preheating zone and raised the temperature of the charged pellets from 600 to 1100° C., while the remaining 16 meters of the furnace length operated as the reduction zone at a temperature of about 1100° C. The central and wall burners were fed 4600 Nm.³ of town gas per day for heating the furnace, with the lowest heat value being 3900 kcal. per Nm.³. The volume of waste gas was 86,000 Nm.³ per day while the temperature of the waste gas at the discharge end of the furnace was about 900° C. The unburned components in the waste gas were less than 1%.

The daily output of the furnace was 26 metric tons of reduced pellets, 6.6 metric tons of excess carbon in the form of coal, as well as the burned dolomite, and some portion of coal ashes. The portion of the iron sponge-like product that was produced having a grain size less than 10 mm. was 7%, and the chemical composition corresponded to that of Example 1.

Of the daily 86,000 Nm.³ waste gas, 36,000 Nm.³ per day was used directly for the drying of the green pellets on the sinter band. A further 36,000 Nm.³ per day was led to heat exchangers to preheat the combustion air required for the heat hardening of the pellets. The remaining 14,000 Nm.³ per day was introduced directly into the burner hoods of the sinter band. In this process, the consumption of energy for pelletizing and heat hardening the pellets was lowered to 220 kcal. per ton.

*Example 3*

(The process of this invention)

The raw green pellets were made in the same way as described in Examples 1 and 2. These pellets were heat hardened on a sinter band of the same size as in those examples, however without grate and wall protective layers.

The pellets were heat hardened at a temperature of 900° C. without cooling. Thus the capacity of the sinter band was further increased by giving an output of 45 tons of pellets per day. The hot pellets removed from the sinter band were fed into the rotary furnace of Example 1 without preliminary sieving and without cooling at a rate of 45 tons of pellets per day.

The reducing material was composed of 21 metric tons of anthracite coal having a 4% water content fed per day into the furnace. This anthracite had the same chemical composition as in Example 1.

For neutralizing the sulphur, 2.1 metric tons of dolomite having a grain size of 1 to 3 mm. were fed per day into the furnace.

The first 4 meters of the rotary furnace length served as the pellet preheating zone and raised the temperature of the mixture of the pellets, coal and dolomite charged to the furnace from 500 to 1100° C., while the remaining 16 meters of the furnace length operated as the reduction zone at a temperature of about 1100° C. The central and wall burners were fed 5750 Nm.³ of town gas per day for heating the furnace, with the lowest heat value being 3900 kcal. per Nm.³. The volume of the waste gas was 99,300 Nm.³ per day while the temperature of the waste gas at the discharge end of the furnace was about 1000° C. The unburned components in the waste gas were less than 1%.

The daily output of the furnace was 32 metric tons of reduced pellets, 9.45 tons of excess carbon in the form of coal beside the burned dolomite and some portion of coal ashes. The portion of the iron sponge like product having a grain size less than 10 mm. was 15 to 20%.

The sensible heat of the waste gas of the rotary furnace was more than that necessary for burning the pellets to a cold strength suitable to the following reduction stage.

*Example 4*

(The process of this invention)

The iron ore used for making the pellets was a hematite of which 70% had a particle size below 60 microns. They were formed in the same way as described in Example 1. The hard burning stage was performed as described in Example 3, however with a temperature of 1100° C. Temperatures in this range usually will be necessary when hematites will have to be burned in the process of this invention. The sinter band delivered a daily output of 45 tons of pellets. These burned pellets had a content of 69% of iron
1% of silicic acid
Less than 0.01% of sulphur They were removed from the sinter band and fed to the rotary furnace of the foregoing examples at a rate of 45 tons of pellets per day without preliminary cooling and sieving.

There, they were reduced in the way described in Example 3. The rates of production and the quality of the products and by-products in the burning stage as well as in the reduction stage were about the same, as in Example 3. Also, the waste gas of the reduction stage was used for the hard burning of the pellets. In order to attain the temperature of 1100° about 50 kg. of oil per ton of pellets were burned additionally in the hard burning stage.

Having now described the means by which the objects of the invention are obtained, we claim:

1. In the process for the direct reduction of heat-hardened iron ore pellets in a rotating cylindrical furnace in which the iron ore is reduced by means of the carbon monoxide formed within the furnace from the solid carbon-containing agents admixed with the pellets, the improvement comprising forming pellets of unreduced non-metallic iron oxide particles, heat hardening said pellets under non-reducing conditions at a temperature of from about 900 to 1150° C. to form heat-hardened pellets having an average cold crushing strength of not more than 100 kg. per pellet, and then charging said heat-hardened pellets directly into said furnace without appreciable loss of their latent heat.

2. In the process as in claim 1, said heat-hardened pellets having an average cold crushing strength of from about 10 to 50 kg. per pellet.

3. In the process of claim 1, further comprising using the CO heat content of the waste gases from said furnace as the combustion heat for heating hardening said pellets.

References Cited by the Examiner

UNITED STATES PATENTS

| | | | |
|---|---|---|---|
| 889,125 | 5/08 | Hartenstein | 75—36 |
| 2,112,566 | 3/38 | Hasselbach | 75—36 |
| 2,855,290 | 10/58 | Freeman | 75—33 |
| 3,029,141 | 4/62 | Sibakin | 75—34 |
| 3,068,091 | 12/62 | Kirkland | 75—36 |
| 3,140,169 | 7/64 | Smith | 75—33 |

HYLAND BIZOT, *Primary Examiner*.

DAVID L. RECK, *Examiner*.